Nov. 12, 1957  L. E. SODERQUIST  2,812,546
APPARATUS FOR CURING PNEUMATIC TIRES
Filed June 12, 1956  7 Sheets-Sheet 1
FIG. I
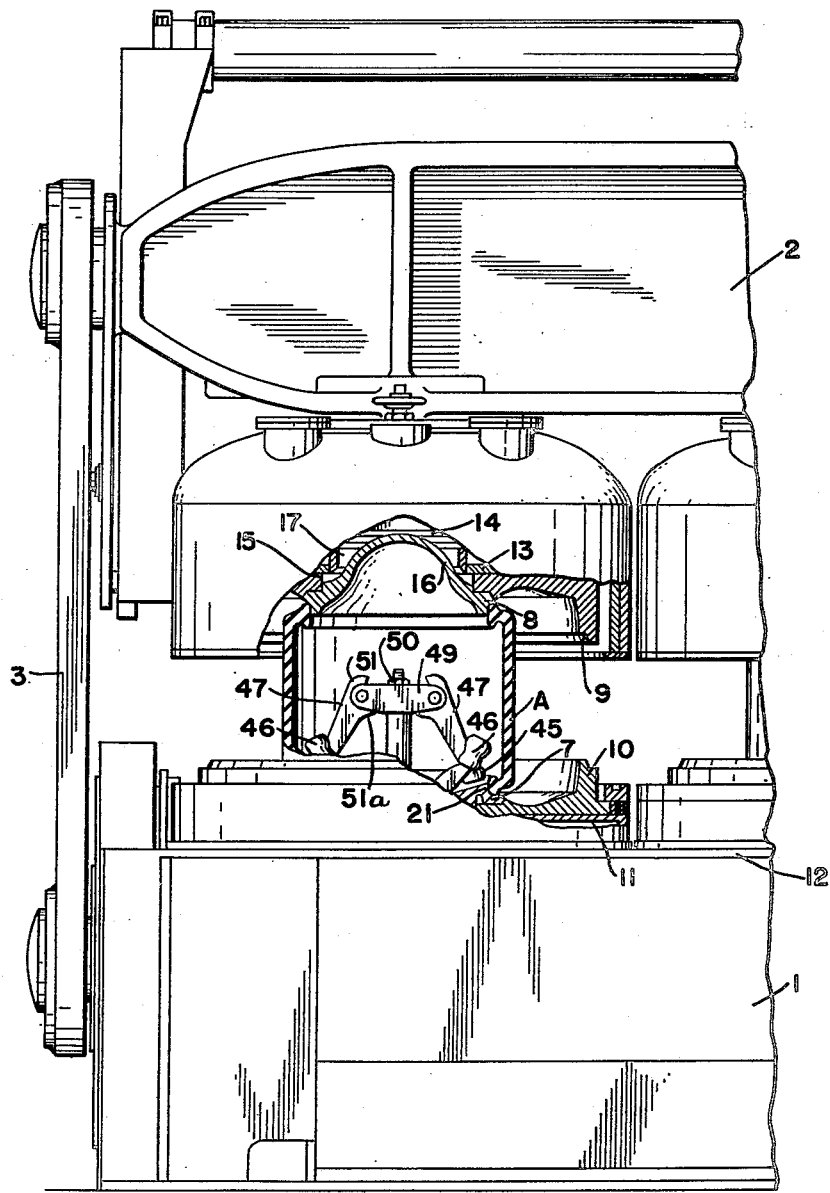
INVENTOR.
LESLIE E. SODERQUIST
BY
ATTORNEYS

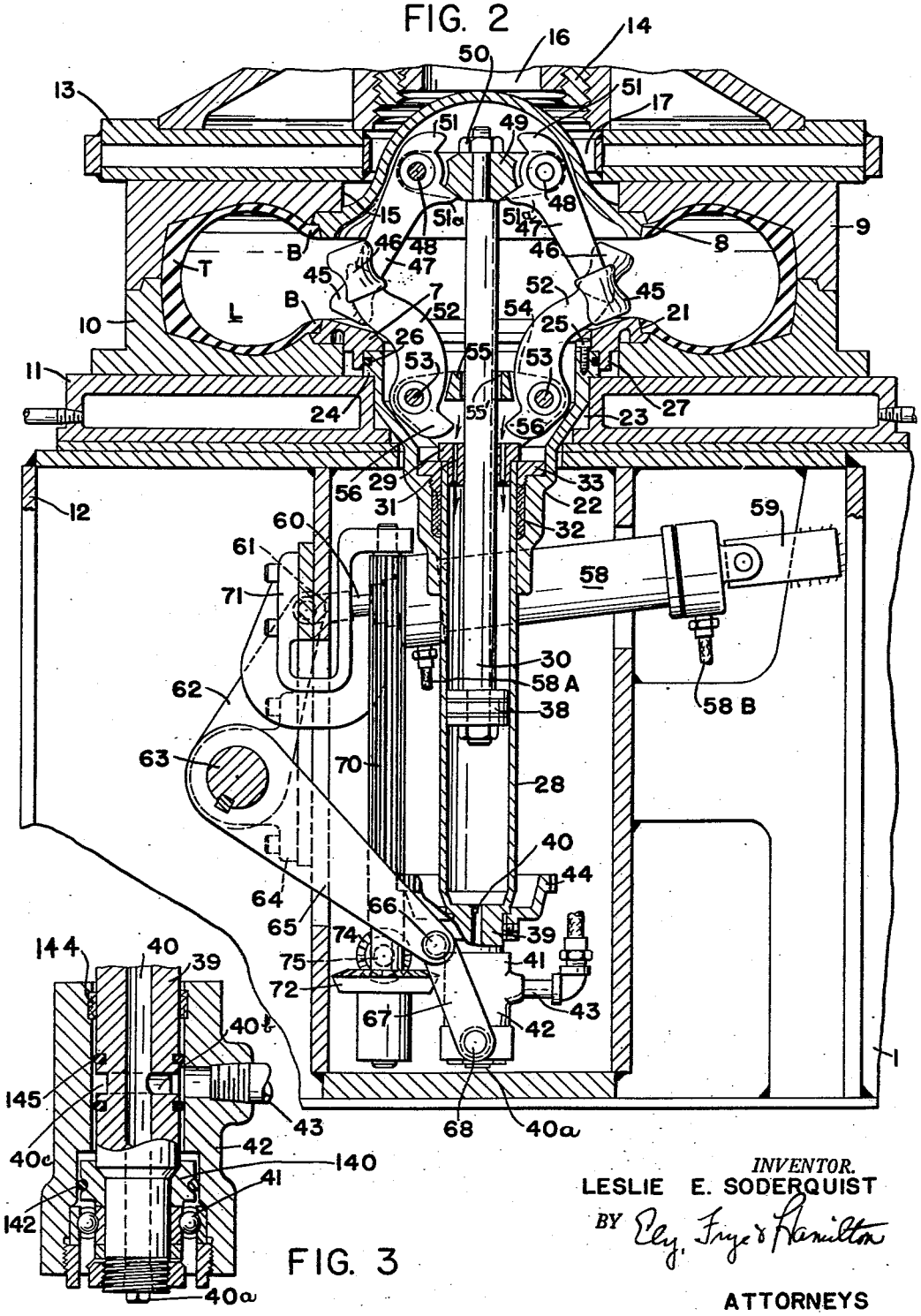

Nov. 12, 1957 L. E. SODERQUIST 2,812,546
APPARATUS FOR CURING PNEUMATIC TIRES
Filed June 12, 1956 7 Sheets-Sheet 3

INVENTOR.
LESLIE E. SODERQUIST
BY
ATTORNEYS

Nov. 12, 1957     L. E. SODERQUIST     2,812,546
APPARATUS FOR CURING PNEUMATIC TIRES
Filed June 12, 1956     7 Sheets-Sheet 4
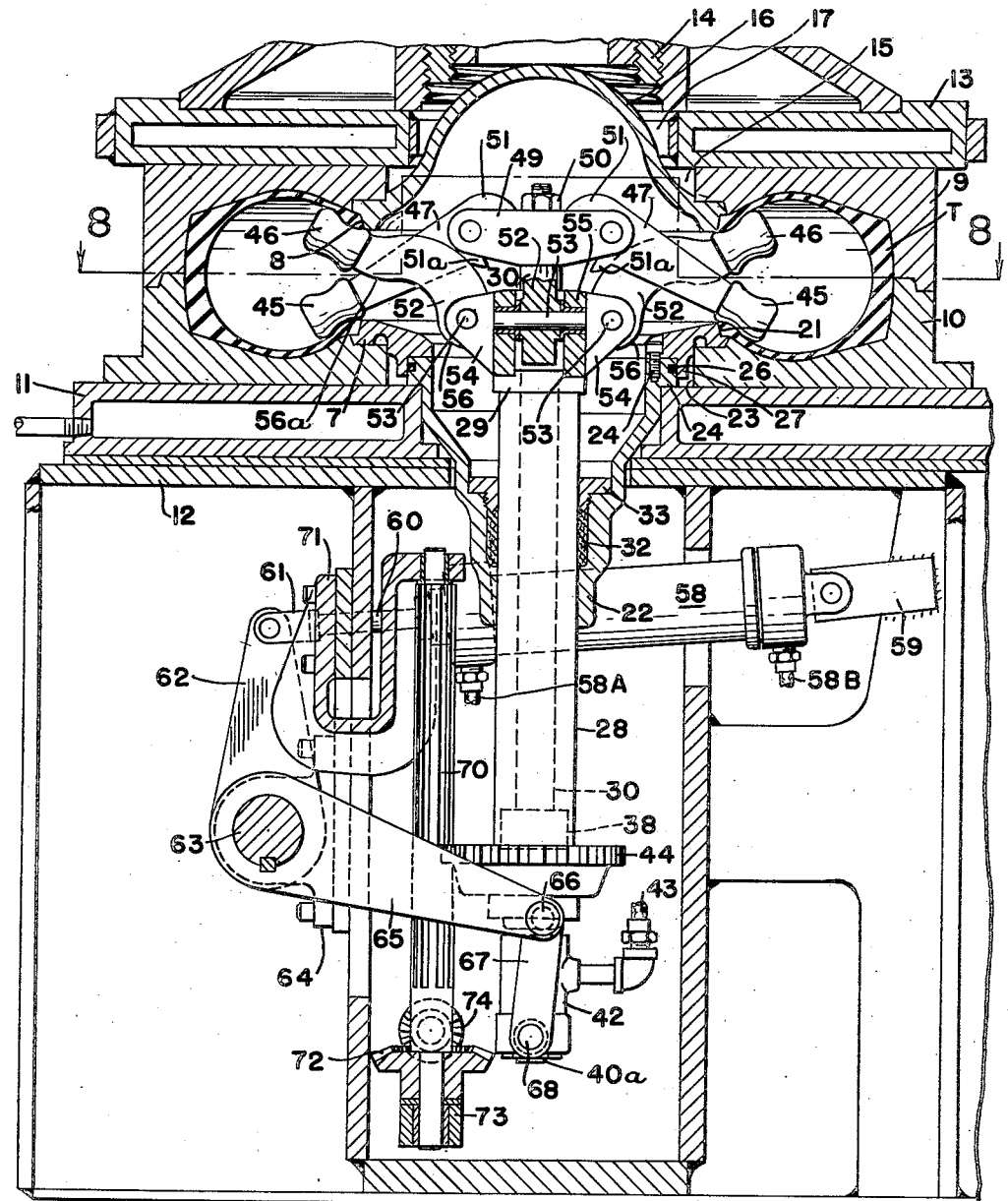
INVENTOR.
LESLIE E. SODERQUIST
BY
ATTORNEYS Nov. 12, 1957  L. E. SODERQUIST  2,812,546
APPARATUS FOR CURING PNEUMATIC TIRES
Filed June 12, 1956  7 Sheets-Sheet 5

INVENTOR.
LESLIE E. SODERQUIST
BY
ATTORNEYS

Nov. 12, 1957 L. E. SODERQUIST 2,812,546
APPARATUS FOR CURING PNEUMATIC TIRES
Filed June 12, 1956 7 Sheets-Sheet 6

INVENTOR.
LESLIE E. SODERQUIST
BY Ely, Fryed Hamilton
ATTORNEYS

United States Patent Office 2,812,546
Patented Nov. 12, 1957

2,812,546

APPARATUS FOR CURING PNEUMATIC TIRES

Leslie E. Soderquist, Silver Lake, Ohio, assignor to The McNeil Machine & Engineering Company, Akron, Ohio, a corporation of Ohio Application June 12, 1956, Serial No. 590,905

27 Claims. (Cl. 18—17)

The present invention relates to an improved press for curing so-called "tubeless tires," and more specifically to improved mechanism for forming the insides of the tire beads to exact contour as the tire is cured.

With the increased use of tubeless tires, which usually have air impervious inner linings, it has been found that the tire bands may be cured under high internal pressure without the interposition of an air bag or flexible diaphragm. Applicant's copending application Serial No. 447,476, filed August 3, 1954, discloses one method of manipulating bead clamping rings to mechanically mold the beads to exact contour while sealing them in the mold to prevent loss of internal pressure from the tire around the beads. A modification of the mechanism of said application Serial No. 447,476 is disclosed in applicant's copending application Serial No. 459,590, filed October 1, 1954, and reference to both of said applications is made as covering structural features of presses designed for the curing of tubeless tires.

The requirements of bead contour in tubeless tires are very severe because the success of the curing operation and the successful performance of the tire require that exact conformity be attained. The bead forming mechanism must also be designed so that it does not interfere with the automatic and dependable operation of the press to avoid damage to the tire and possible injury to workmen.

The principal object of the present ivention is to improve upon the shaping of the tire beads to exact contour during the curing operation and eliminate the disadvantages of bead clamping rings in respect to marks or imperfections caused by the rings on the bead inner and outer surfaces, and yet to seat the beads firmly in the bead seats in the mold so that the beads will be perfectly formed.

In the specific embodiment of the present invention, bead rollers are mounted on hinged arms which are introduced into the uncured tire band as the press closes. During the closing of the press, pressure is introduced into the tire to shape the tire, and the rollers are automatically inserted into the tire and rotated in pressure contact with the inside of the beads to force the beads into their respective seats and to roll the tire beads into the desired contour. After the cure proceeds for a sufficient time to fully shape the beads and cause them to be fully seated in the mold sections, the rollers are withdrawn and the curing of the tire is completed.

After the curing operation is completed and the upper mold section has been elevated, the bead forming rollers are reinserted into the tire and, while the lower tire bead is held in contact with the lower mold section by one set of rollers, the other set raises the upper tire bead, deforming the tire so that any water of condensation or other liquid which may have collected in the interior of the tire will be drained out of the tire. This is an important feature of the invention because any liquid on the inside of the tire will be very hot at this point and is dangerous to the operator.

When the tire has drained, which will normally be after a short interval controlled by a timing mechanism, such as commonly employed in this art, the lower bead rollers will be withdrawn and the upper bead rollers raised to elevate the cured tire out of the lower mold section.

The several operations are carried on in their prescribed sequence, which is controlled by a timing mechanism or by the movement of parts of the press. Timing mechanisms for controlling the operation of curing presses of the general type shown herein are well known in the art and need not be described.

The rollers which contact the inner surfaces of the tire beads should be made of a material which will not adhere to the rubber. Such a material may be "Teflon," a tetrafluoroethylene resin made by Dupont of Wilmington, Delaware.

A preferred embodiment of the invention is shown in the accompanying drawings by way of example, and described in detail in the specification in a manner to enable one skilled in the art to understand fully the construction and operation. Various modifications and changes in details of construction are comprehended within the scope of the appended claims.

The mechanism for opening and closing the press may be similar to that shown in applicant's prior Patent No. 2,495,664, dated January 24, 1950, but other press operating mechanism may also be used. The upper mold section of the press may be rocked to and from parallel, spaced relation with the lower mold section, or the upper or lower section may be moved in a straight line during the entire opening and closing operations. It is essential, however, that the movable mold section be moved in a straight line in parallelism with the other mold section during the actual shaping operation, which occurs after both mold sections have made contact with the edges of the tire band.

Referring to the drawings:

Fig. 1 is a view of a press of the type set forth, partially in section, illustrating the position of the upper and lower mold sections with an uncured band in place and with the upper mold section in contact with the upper edge of the tire band. In this view, the bead forming rollers are collapsed.

Fig. 2 is a vertical sectional view of the press in closed position, as in the curing of the tire, showing the bead shaping rollers withdrawn from the tire, the upper and lower roller arms being shown as rotated slightly out of true position relative to each other axially of the piston rod, for the sake of clarity.

Fig. 3 is a detail at the base of the cylinder.

Fig. 6 is a vertical section through the press showing the position of the forming rollers in contact with the beads of the tire during the early stage of curing.

Fig. 7 is an enlarged sectional detail showing the manner in which the shaping rollers force the bead of the tire into its seat in the mold.

Press structure

Figures 4, 5:
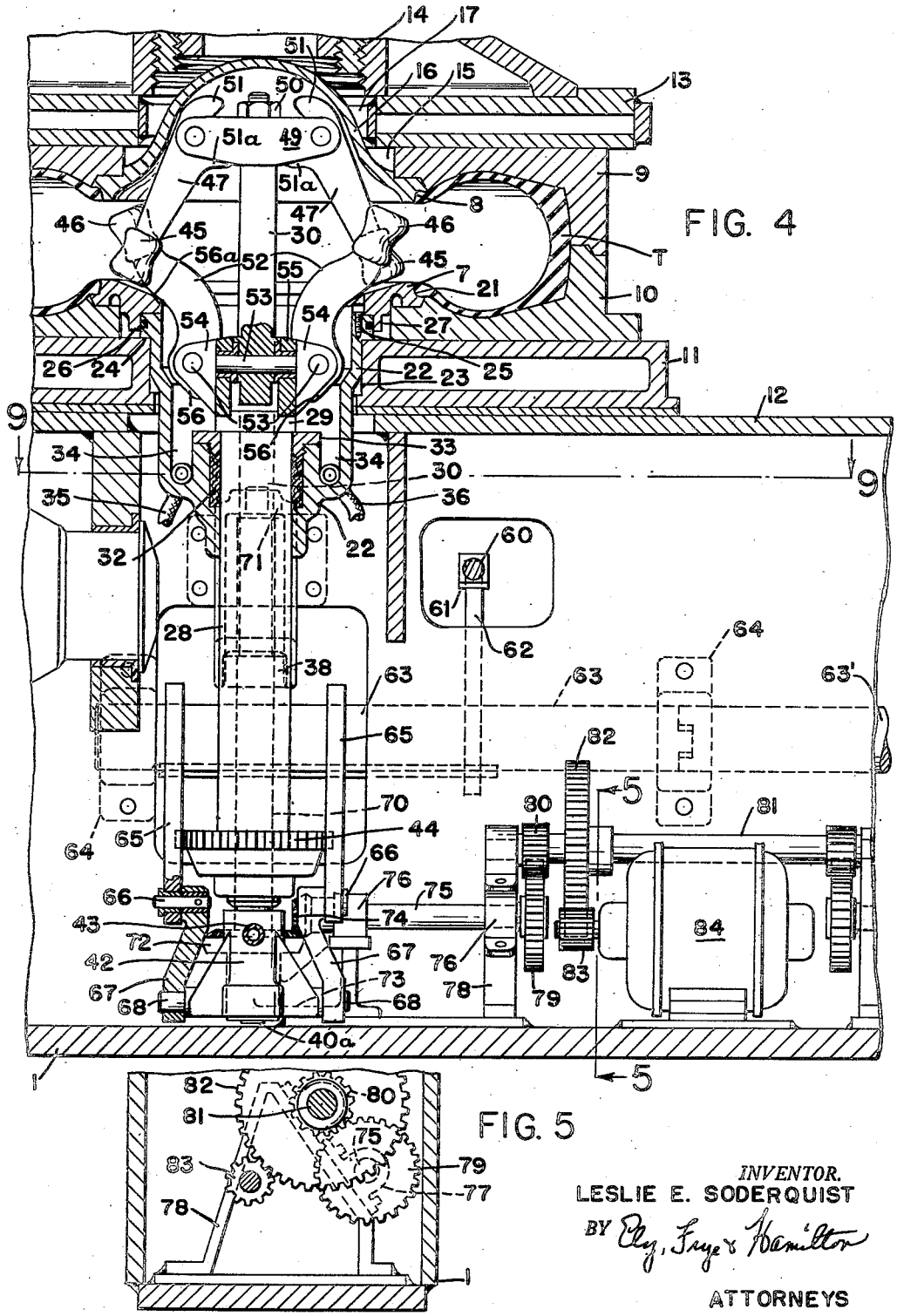
Fig. 4 shows the bead rollers about to be inserted into the tire. This view is on a plane at right angles to Fig. 2.
Fig. 5 is a detail on the line 5—5 of Figs. 4 and 9.
Figure 8:
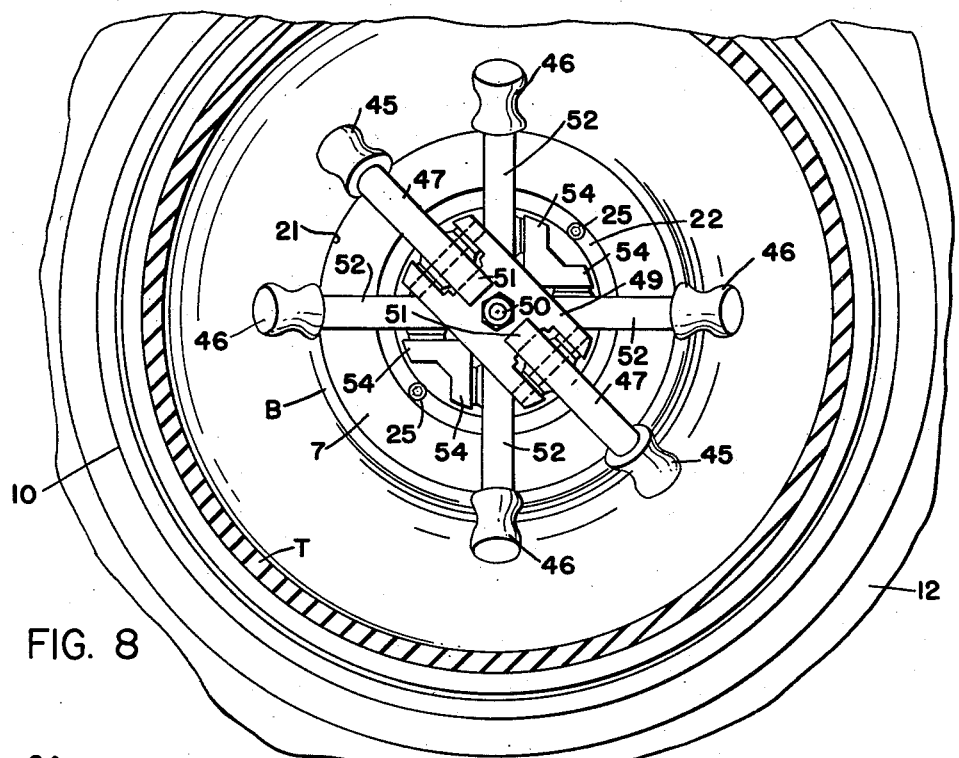
Fig. 8 is a horizontal section on the line 8—8 of Fig. 6.

The press is designed to cure a tubeless tire shown at T having an impervious lining L on the interior of the tire and around the base of the beads B. The under surfaces of the beads are usually tapered as shown in Fig. 7 to provide a tight fitting area at the rim seat when the tire is mounted on the rim, and the exterior surfaces of the beads are shaped in exact contour to seal against the rim flanges and may have sealing ribs R formed thereon.

The press may be of any standard type. If it is of the form such as shown in applicant's prior patents, it will have a base 1 on which the lower mold section 10 is mounted, and an upper cross head 2 to which the upper mold section 9 is attached. A link 3 forms part of a toggle mechanism which moves the cross head toward and from the base, the latter part of the closing movement and the first part of the opening movement being such that the two mold sections are moved with their faces in parallelism.

It will be understood that the uncured band A is located in the lower mold section 10 with its lower edge or bead seated in a bead forming ring 7 which forms a part of the lower mold section. As the press closes, the upper edge of the uncured band is contacted by the bead seat 8 formed in a dome 16 which carries the heated platen 13 to which the upper mold section 9 is attached.

The lower mold section 10 is mounted on a steam-heated platen 11 which is carried on the bed 12 of the press, and the upper mold section 9 is fastened to a second steam-heated platen 13, which has an adjustable connection 14 with the cross head or other means for movably supporting the upper mold section. The central opening 15 in the upper mold section is closed by a dome-shaped plate 16 which projects upwardly through the central hole 17 in the platen 13.

As the press is closing, the internal shaping pressure is admitted to the interior of the band, and before the press opens at the end of the curing cycle the pressure within the tire is relieved. These operations are controlled by the well-known automatic timing devices so that all the operator is required to do is place the uncured tire band in position on the lower mold and press a starting button, and when the press opens at the end of the curing operation he removes the cured tire.

The lower rim of the dome plate 16 is set in and secured to the upper mold section, and its outer face is preferably machined to have an exact tapered surface or bead seat 8 for forming the tapered surface on the underside of the upper bead B. The lower mold section has the inserted ring 7 with a tapered surface or bead seat 21 on its outer face matching the tapered surface 8. The outer shoulders surrounding these tapered surfaces 8 and 21 merge with the adjoining mold surfaces to form the desired external bead contour.

The ring 7 is seated on the upper end of a ring-shaped gland 22 which fits within a central opening 23 in the lower platen 11 and has an annular shoulder 24 seated on the upper surface of the platen 11. Bolts 25 secure the ring 7 to the gland 22 and an O-ring seal 26 is provided between the shoulder 24 and a depending flange 27 on the ring 7.

The bead forming rollers and their operation

Figure 9:
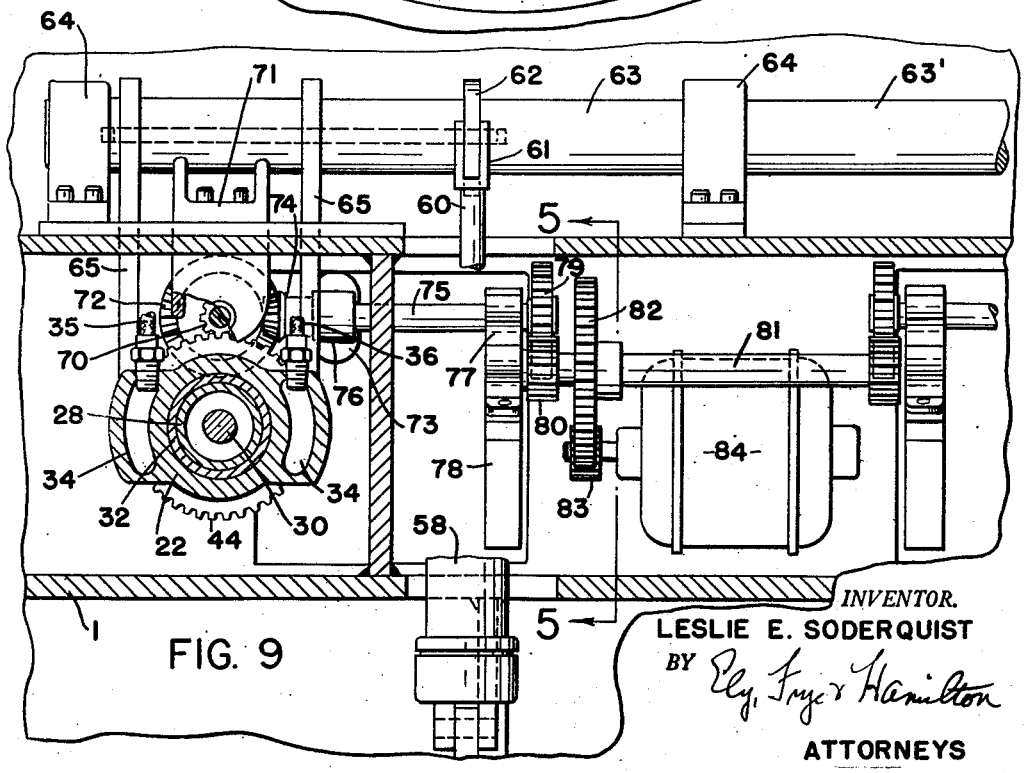
Fig. 9 is a horizontal section on the line 9—9 of Fig. 4.

A cylinder 28 is slidably mounted within the gland 22 and extends downwardly therefrom into the base 1. A shouldered plug 29 is secured in the upper end of the cylinder 28 within the gland 22 and has a central bore through which a piston rod 30 extends. The plug 29 has fluid ports 31 around its central bore through which pressure fluid can pass from the interior of the tire band into the upper end of the cylinder. Packing material 32 is provided between the cylinder 28 and gland 22 and is compressed by a jam ring 33. As shown in Figs. 4 and 9, troughs or channels 34 are provided in opposite sides of the gland 22, and conduits 35 and 36 connect with said troughs to supply and discharge the high pressure steam, water or other curing medium to the interior of the tire band for shaping the tire.

The piston rod 30 has a piston 38 on its lower end and the lower end of cylinder 28 is formed into a reduced hub portion 39 having an axial passageway 40 therethrough. The hub 39 is journaled by means of an anti-friction bearing 41 in the housing 42 and passageway 40 is closed at its lower end by a plug 40a (see Fig. 3). A branch passage 40b leads to a channel 40c formed in the lower outer surface of the hub 39. A fluid conduit 43 is set in the side of the housing 42 and leads into the channel 40c to supply or exhaust hydraulic pressure fluid from the lower end of cylinder 28. A bearing ring 140 having a packing ring 142 on its outer face provides a step bearing for the hub 39 in the housing 42 and prevents the passage of the fluid pressure medium outwardly through the lower end of the housing 42. A packing 144 and O-rings 145 are also employed to prevent loss of fluid pressure between the housing 42 and the hub 39.

A pair of bead shaping rollers 45 for the lower bead are hingedly mounted at diametrically opposite points on the upper end of the piston rod 30, and four bead shaping rollers 46 for the upper bead are hingedly mounted on the upper end of the plug 29. The bead shaping rollers 45 are rotatably mounted on the outer ends of arms 47 which are hinged at their inner ends on pivot pins 48 on opposite sides of a cross head 40 secured on the upper end of piston rod 30 by a nut 50. One pair of arms 47 is shown. The inner ends of arms 47 have stop lugs 51 and 51a for engaging the upper and lower surfaces, respectively, of cross head 49 to limit their hinging movement in both directions to the positions shown in Figs. 2 and 6.

Figure 10:
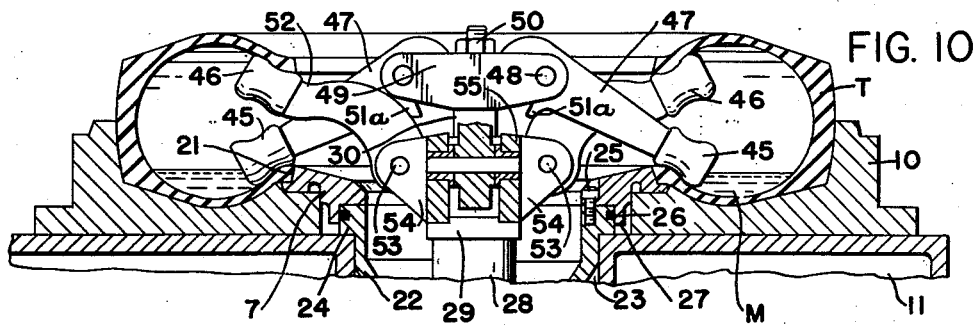
Fig. 10 is a view showing the rollers inserted into the tire as the end of the curing operation, the upper section of the mold being raised out of the way.

The bead shaping rollers 46 are rotatably mounted on the outer ends of arms 52, the inner ends of which are pivoted on pins 53 in ears 54 formed as a part of and extending upwardly from the plug 29. Four pairs of ears 54 are spaced equally around a central connecting web 55 in which the piston rod 30 is splined by a key 55'. Stop lugs 56 on the inner ends of arms 52 engage the underside of the web 55 to limit outward swinging of the arms into the tire band to the position of Figs. 6 and 10. Shoulders 56a on the underside of arms 52 ride on the ring 7 to lift and hold the arms in raised position when the cylinder 28 is lowered as in Figs. 2 and 4. The contour of the rollers 45 and 46 is designed to conform to and shape the internal surfaces of the tire beads B.

Figure 13:
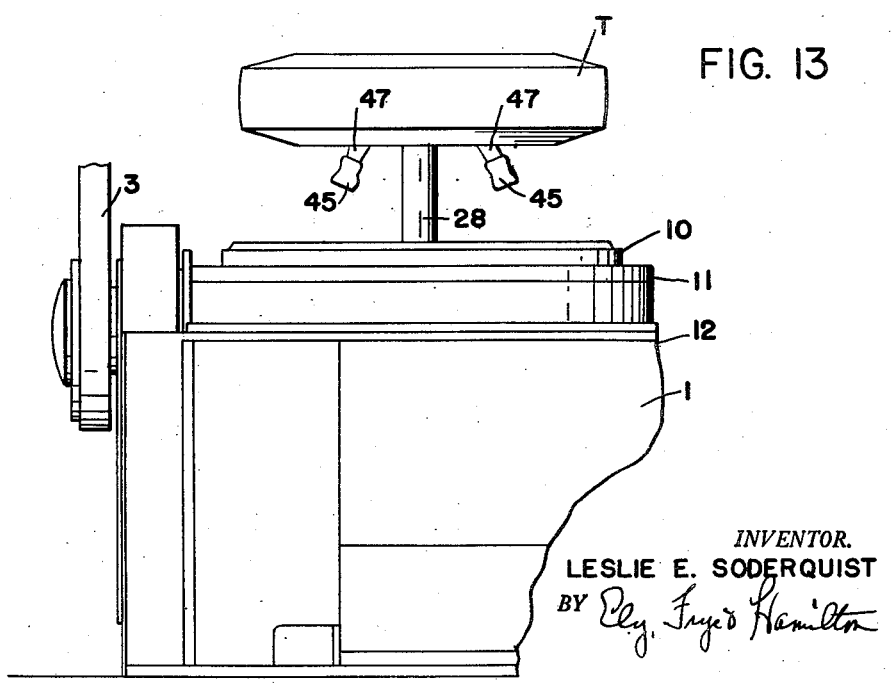
Fig. 13 shows the cured tire raised above the lower mold for removal.

It will have been noted that there are two rollers 45 with their corresponding arms 47 carried by the piston 30 and four rollers 46 with their corresponding arms 52 carried by the cylinder 28, and that the rollers 45 are located between two adjacent rollers 46. While both sets of rollers engage their respective lower and upper beads to perform the act of forcing the beads into their bead seats and two of each would be sufficient for this purpose, the rollers 46 which contact the upper bead have the additional office of raising the upper bead to spread and drain the tire, as in Figs. 11 and 12, and then to lift the cured tire out of the lower mold section 10, as shown in Fig. 13. Therefore, it is desirable to have more than two, and preferably four, upper bead rollers to lift the tire out of the mold properly.

The operation of the rollers is as follows:

The admission of the curing medium under pressure into the interior of the tire band through the supply conduit 35 and thence through the ports 31 into the upper end of the cylinder 28 forces the piston downwardly. At this time the conduit 43 is connected to the exhaust.

As the piston rod 30 moves downwardly, the cylinder 28 and the rod 30 are started in rotation by means to be described and this rotation is continued as long as it is necessary to roll the upper and lower tire beads in place.

During the downward movement of the rod 30 the rollers 45 contact the ring 7 which causes the arms 47 to swing outwardly on their pivots 48 until the lugs 51 engage the upper side of the cross head 49, and this action moves the rollers 45 into the tire band and then into engagement with the inner surface of the lower tire bead, as shown in Fig. 6. The pressure exerted on the piston 38 holds the rollers in contact with the lower bead with a yielding pressure during the rolling operation.

At the same time the cylinder 28 is raised by mechanism to be later described, and the arms 52 which are resting upon the ring 7 swing outwardly by gravity into the tire band until the lugs 56 contact the underside of the web 55 and, as the movement is continued, the rollers 46 engage the upper bead, as shown in Fig. 6, and are held there by yielding pressure during the rolling operation.

Movement of the piston rod 30 in the opposite or upward direction is accomplished by fluid pressure admitted to the lower end of the cylinder 28 through port 40, a preponderance of pressure overcoming the counter pressure from the interior of the tire. As the rod 30 rises, the arms 47 fall into the lowered position shown in Fig. 2 where they are arrested by contact of the lugs 51a with the underside of the cross head 49.

Lowering of the cylinder 28 will bring the shoulders 56a into contact with the ring 7 and withdraw the rollers 46 from the interior of the tire.

The means for raising the cylinder 28 preferably comprises a pressure fluid cylinder 58 having fluid connections 58A and 58B at opposite ends. The cylinder is pivoted at one end on a bracket 59 on the base 1, and has a piston rod 60 projecting from its other end. The piston rod 60 is hinged by a clevis 61 to a lever arm 62 secured on an actuator shaft 63 journaled in bearing brackets 64 mounted on the base. As shown in Fig. 9, the shaft may be extended at 63' for the purpose of operating the cylinder of another mold unit, if it is desired to operate the press as a dual press.

A pair of levers 65 is secured on the actuator shaft 63 straddling the ring gear 44 on cylinder 28, and the outer ends of said levers are pivoted at 66 to links 67 which are in turn pivoted at 68 to the bottom end of housing 42 journaled on the bottom of cylinder 28. Thus, as the piston rod 60 is extended, the shaft 63 is rotated counterclockwise as viewed in Figs. 6 and 12, raising the housing 42 to the position shown in Fig. 12, and with it the cylinder 28 to swing the arms 52 outwardly and engage the rollers 45 with the inner surface of the lower bead B. Reversal of the cylinder 58 returns the arms 52 to idle position.

As the two sets of arms are moved into the tire and into the position of Fig. 6, the ring gear is rotated to rotate both sets of arms by rotating the cylinder 28 and the piston rod 30 through the spline connection 55'. This is accompanied by a long cylindrical pinion 70 which meshes with ring gear 44 and allows the gear to rise as it is driven by the pinion. The upper end of pinion 70 is journaled in a bracket 71 secured to the bed 12, and the lower end has a bevel gear 72 thereon which is rotably mounted on a bracket 73 on the base. The bevel gear is driven by a bevel pinion 74 on one end of a shaft 75 journaled in a bearing 76 integral with bracket 73 on the base and in bearings 77 on the bearing stands 78 (Fig. 5).

The other end of shaft 75 is connected by gears 79 and 80 to the driveshaft 81 which is driven by gear 82 and pinion 83 from the motor 84. As indicated in Figs. 5 and 9, the driveshaft 81 may be extended beyond the other end of the motor, and the gearing duplicated for rotating the piston of another unit as part of a dual press operation.

In the operation of the press during cure, as the mold is closed over the tire band the roller arms are within the band in the folded position of Fig. 1. As the mold is closing, internal pressure is admitted through conduit 35 to shape the tire in the mold, and this pressure lowers the upper roller arms 47. At the same time pressure is admitted through conduit 35, pressure fluid is admitted through conduit 58B into cylinder 58 to operate piston rod 60 and raise the cylinder 28, raising the lower rollers 46. The introduction of the rollers into the tire is preferably after the mold is closed, but this is not essential as the rollers may operate while the mold is partially open. In any event the mold should be positioned about the uncured tire.

As the arms start to move toward each other, the electric motor 84 is started, rotating the upper and lower arms axially of piston rod 30, so that as the rollers 45 and 46 engage the beads in the position of Fig. 6 they are already rotating, thus preventing any marking or uneven pressures on any part of the beads. These operations may be controlled by suitable well-known timing devices so that they take place during the first part of the curing cycle.

After a predetermined period of time, when the beads will have become firmly seated and formed to the correct contour, hydraulic pressure is admitted through conduit 43 in sufficient amount to overcome the internal steam pressure and raise the piston 38, the operating piston 60 is reversed to lower cylinder 28, and both sets of roller arms are withdrawn from the tire and the motor is shut off, stopping rotation of the arms. The curing cycle is continued to finish the vulcanizing of the tire, during which time the internal pressure will hold the beads in position, after which the internal pressure is relieved, the press is opened and the tire removed.

The roller formed tire beads have smooth inner surfaces and their outer surfaces are shaped to exact required contour without imperfections, so that the beads which are roughly shaped in the uncured state are perfectly formed during the rolling operation.

*Removal of the cured tire*

After the tire is cured, the upper mold section is raised and the tire is ready to be removed from the lower mold section. When tires are cured with internal pressure in direct contact with the tire, the curing medium will collect on the inside of the tire and, as it is scalding hot, it is necessary for the safety of the workmen to drain any residual medium out of the tire before removing it from the press. This residuum, which is indicated at M in Figs. 10 and 11, may be water of condensation or it may be any other fluid medium used in the curing of the tire. Thereafter, the tire must be stripped from the lower mold section and raised into position to be removed by the workman.

The above described operations are performed by the bead shaping rollers which come into play again after the cure has been completed, or substantially so. This operation is automatically set in motion by electrical control mechanism (not shown). These operations are shown in Figs. 10 to 13, inclusive.

Figure 11:
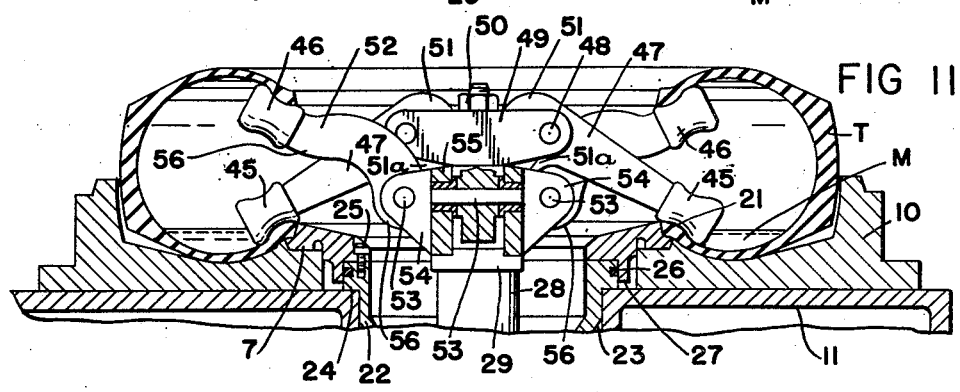
Fig. 11 shows the tire being separated or "cracked" from the lower mold section.

Just before the press starts to open, the pressure is released from the lower end of the cylinder 28 so that the piston rod 30 is lowered and at the same time the cylinder 28 is raised, which reintroduces the two sets of rollers into the interior of the tire as shown in Fig. 11. At this time the rollers are not being revolved by the motor 84. The lowering of the rod 30 holds the rollers 45 against the lower bead and, while the rollers are held in contact with the lower bead, and after the upper mold section 9 has been raised the cylinder 28 is raised, which elevates the four rollers 46 and the first action is to crack the tire away from the lower mold section.

Figure 12:
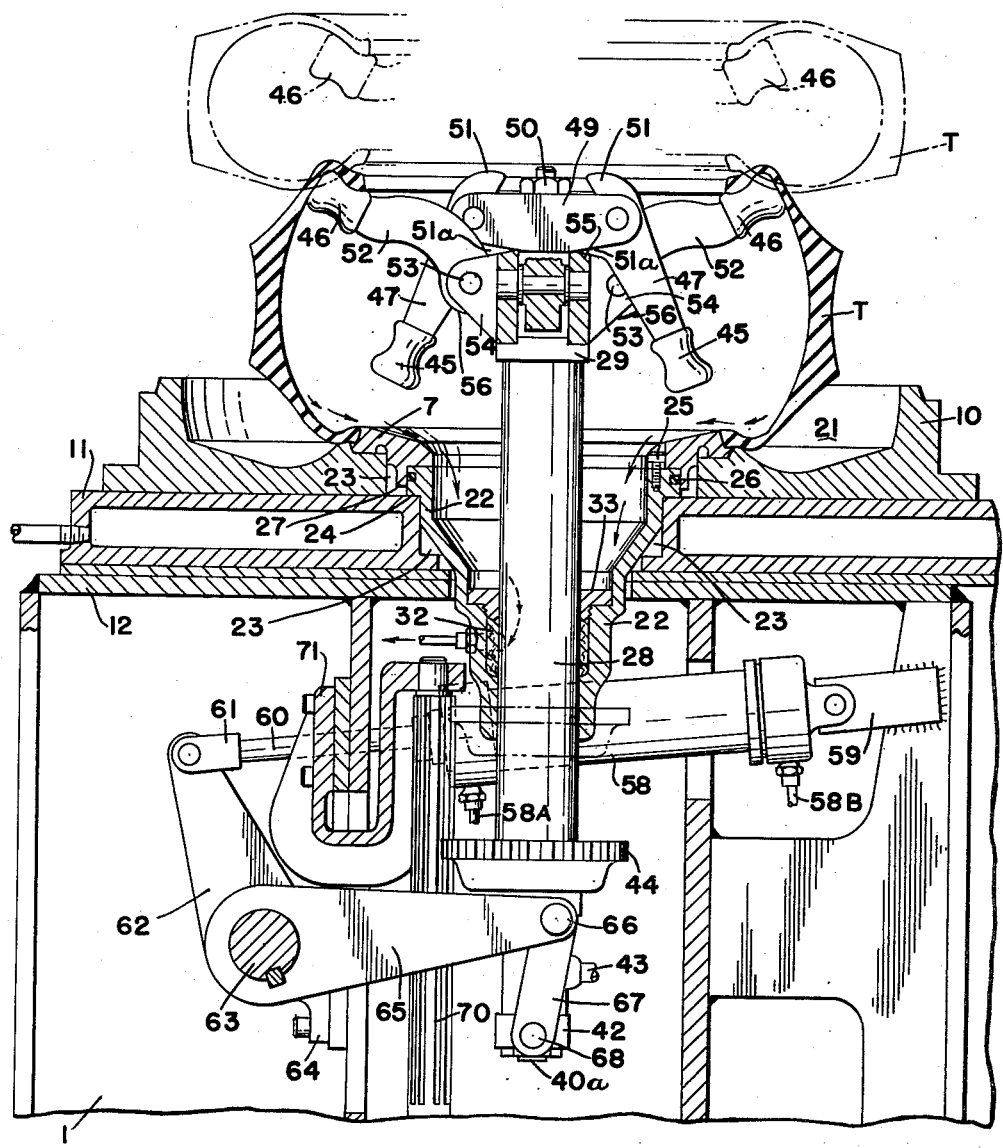
Fig. 12 shows the position of the parts when the beads of the tire are spread apart for the draining operation.

Continued upward movement of the cylinder 28 will cause the upper bead rollers 46, acting upon the inner surface of the upper bead, to spread the tire and the residuum M will drain out of the tire, as shown by the arrows in Fig. 12. The adhesion of the lower bead of the tire to the lower mold will be sufficient to insure this spreading action. The upward movement of the cylinder 28 will raise the cross head 49 and the rollers 45 will drop as shown in full lines in Fig. 12.

If desired, the upward travel of the cylinder 28 may be stopped or retarded momentarily to alow the residuum to drain out completely, and thereafter the cylinder 28 moves upwardly, stripping the cured tire from the lower mold section as shown in Fig. 13. After the tire has been removed the cylinder 28 is lowered, restoring the bead rollers to the idle position as shown in Fig. 13.

Resumé

The operation will have been understood from the foregoing, it being sufficient to say that there has been provided a new and improved mechanism which will operate first to force the beads of the tire into position in their seats, into which they are forced with a rolling action which will not mar the inner surfaces of the beads. Thereafter the pressure exerted during the curing operation will hold the beads in position during the cure. After the cure is completed, these same rollers serve first to spread the tire and drain out any objectionable condensate or any other liquid from the tire, and will then raise the tire so that it can be removed from the press.

The mechanism shown and described herein is subject to modification and improvement within the scope of the invention, and the invention is not necessarily limited or restricted to exact or detailed following of the particulars set forth herein.

While the invention is shown as incorporated in a press for shaping and curing tires of the type designed by the applicant, it may be used with other types of shaping and curing presses or with presses which vulcanize a shaped or partially shaped tire band.

What is claimed is:

1. A press for curing tires in which a curing pressure medium is in direct contact with the interior of the tire, comprising two mating mold sections each having a bead seat and means operative while the mold is positioned about the uncured tire for forming the beaded edges of the uncured tire and pressing them into their respective bead seats by a circumferential rolling action.

2. A press for curing tires in which a curing pressure medium is in direct contact with the interior of the tire, comprising two mating mold sections each having a bead seat and means operative while the mold is positioned about the uncured tire for forming the beaded edges of the uncured tire by a circumferential rolling action, said means being movable into and out of the tire.

3. A press for curing tires in which the curing pressure medium is in direct contact with the interior of the tire, comprising two mating mold sections each having a bead seat and rollers movable into the interior of the tire while it is between the mold sections, said rollers being movable around and in contact with the beads of the tire and serving to form and roll the beads into their respective seats.

4. A press for curing tires in which the curing pressure medium is in direct contact with the interior of the tire, comprising two mating mold sections each having a bead seat and rollers movable into the interior of the tire while it is between the mold sections, said rollers being movable around and in contact with the beads of the tire and serving to form the beads and roll them into their respective seats, and means to separate the rollers after the cure and while held in contact with the beads to spread the cured tire and drain any residual liquid therefrom.

5. A press for curing tires in which the curing pressure medium is in direct contact with the interior of the tire, comprising two mating mold sections each having a bead seat and rollers movable into the interior of the tire while held between the mold sections, said rollers being movable around and in contact with the beads of the tire and serving to roll the beads into their respective seats, and means to lift the cured tire out of the mold by one of the rollers.

6. A press in accordance with claim 3 in which yielding pressure is maintained on the rollers during the rolling operation.

7. In a press for curing tires in which the curing pressure medium is in direct contact with the interior of the tire, said press having relatively movable mold sections and means for moving the mold sections together with an uncured band between them, a cylinder movable axially of the tire, a piston in said cylinder, arms on said piston and cylinder and having rollers at their ends, means acting on the arms to move them outwardly, means to rotate said piston and cylinder to roll the rollers over said bead portions, and means to exert pressure on said piston and cylinder to press the rollers against the bead portions of the tire.

8. In a press for curing tires in which the curing pressure medium is in direct contact with the interior of the tire, said press having relatively movable mold sections and means for moving the mold sections together with an uncured band between them, a cylinder movable axially of the tire, a piston in said cylinder, a set of arms on said piston and having rollers for movement into contact with one bead portion of said tire, a second set of arms on said cylinder and having rollers for movement into contact with the other bead portion, means to rotate said piston and cylinder and means to move the arms outwardly, and means to move said piston and cylinder relative to each other to press the rollers into contact with the respective bead portions.

9. In a press for curing tires in which the curing pressure medium is in direct contact with the interior of the tire, said press having relatively movable mold sections and means for moving the mold sections together with an uncured band between them, a set of rollers for engaging one bead portion of said tire, a second set of rollers for engaging the other bead portion, means mounting said rollers within the mold for movement into the tire into contact with the respective bead portions when the mold sections are closed, means for rotating said rollers while in said tire, and means for pressing the rollers against said bead portions as they are rolled over said bead portions.

10. In a press for curing tires in which the curing pressure medium is in direct contact with the interior of the tire, said press having relatively movable mold sections and means for moving the mold sections together with an uncured tire between them, rollers for engaging the bead portions of said tire, means mounting said rollers for movement into and out of said tire, means for rotating said rollers to move them into said tire, and means for pressing the rollers against said bead portions as they are rolled over the same.

11. A press for curing tires in which the curing medium is in direct contact with the interior of the tire, a pair of relatively movable mold sections, two groups of rollers, means to insert the groups within the tire while the mold is closed and to spread the groups apart so that one group bears against the upper tire bead and one against the lower tire bead, said spreading means being operative after the curing is completed and the mold sections are opened to separate the groups while in contact with their respective beads, and thereafter to raise the first named group to lift the tire from the lower mold section.

12. A press for curing tires in which the curing medium is in direct contact with the interior of the tire, a pair of relatively movable mold sections, two groups of rollers, means to insert the groups within the tire while the mold is closed and to spread the groups apart so that one group bears against the upper tire bead and one against the lower tire bead, said spreading means being operative after the curing is completed and the mold sections are opened to separate the groups while in contact with their respective beads, and thereafter to remove the groups from the tire and then to raise the first named group to lift the tire from the lower mold section.

13. In a press for curing tires in which the curing medium is in direct contact with the interior of the tire, said press having relatively movable mold sections and means for moving the mold sections together with an uncured band between them, a cylinder extensible into the mold sections axially of said tire, a piston in said cylinder and having a rod projecting therefrom, arms carried by said cylinder and piston for movement into said tire and having rollers journaled thereon, means to move the arms outwardly and to rotate said cylinder and piston to roll the rollers over the bead portions of said tire, means for moving said cylinder axially into said tire as the cylinder is rotated, the relative movement of said cylinder and piston acting to press the rollers against the respective bead portions as they roll over the same.

14. In a press for curing tires in which the curing medium is in direct contact with the interior of the tire, said press having relatively movable mold sections and means for moving the mold sections together with an uncured band between them, a cylinder movable axially of said tire, a piston mounted in said cylinder for axial non-rotative movement and having a rod projecting from said cylinder, arms hinged on said cylinder and piston having rollers for swinging into said tire, means to move the arms outwardly, means to rotate said cylinder and piston, means for moving said cylinder axially into said tire as the cylinder rotates, and said piston being movable into said cylinder by the internal curing pressure, the relative axial movement of said cylinder and piston acting to press the rollers against the respective bead portions as they roll over the same.

15. In a press for curing tires in which the curing medium is in direct contact with the interior of the tire, said press having relatively movable mold sections and means for moving the mold sections together with an uncured band between them, a cylinder movable axially of said tire, a piston mounted in said cylinder for axial non-rotative movement and having a rod projecting from said cylinder, arms hinged on said cylinder and piston having rollers for swinging into said tire, means to rotate said cylinder and to swing the arms outwardly from the cylinder and piston into contact with the bead portions of said tire, means for moving said cylinder and piston axially relatively to each other as the cylinder is rotated to press the rollers against the respective bead portions as they roll over the same.

16. In a press for curing tires in which the curing pressure medium is in direct contact with the interior of the tire, said press having relatively movable mold sections and means for moving the mold sections together with an uncured band between them, a cylinder movable axially of said tire and having one end projecting from said mold sections, a piston mounted in said cylinder for axial non-rotative movement and having a rod projecting therefrom into said mold sections, arms hinged on said cylinder and piston within said mold sections for swinging into said tire, rollers journaled on said arms, means to rotate the outer end of said cylinder and to swing the arms radially outward from the cylinder and piston into contact with the bead portions of said tire, and fluid pressure means to move said cylinder and piston axially relative to each other as they are rotated to press the rollers against the respective bead portions as they roll over the same.

17. In a press for curing tires in which the curing pressure medium is in direct contact with the interior of the tire, said press having relatively movable mold sections and means for moving the mold sections together with an uncured band between them, a cylinder movable axially of said tire and having one end projecting from said mold sections, a piston mounted in said cylinder for axial non-rotative movement and having a rod projecting therefrom into said mold sections, arms hinged on said cylinder and piston within said mold sections for swinging into said tire, rollers journaled on said arms, means to rotate the outer end of said cylinder and to move the arms radially outward from the cylinder and piston into contact with the bead portions of said tire, fluid pressure means to move said cylinder axially into said mold sections as said cylinder rotates, the piston being movable into said cylinder by the internal curing pressure within the mold sections, and the relative axial movement of the cylinder and piston acting to press the rollers against the respective bead portions as they roll over the same.

18. In a press for curing tires in which the curing pressure medium is in direct contact with the interior of the tire, said press having relatively movable mold sections and means for moving the mold sections together with an uncured band between them, a cylinder extensible into the mold sections axially of said tire and having one end projecting from said mold sections, a piston mounted in said cylinder for axial non-rotative movement and having a rod projecting therefrom into said mold sections, arms hinged on said cylinder and piston within said mold sections for swinging into said tire, rollers journaled on said arms, means to move said cylinder axially into said mold sections, said piston being movable into said cylinder by the internal curing pressure within the mold sections, and means to rotate the projecting end of said cylinder as it is moved axially, the relative axial movement of said cylinder and piston acting to press the rollers against the respective bead portions of the tire during rotation of the cylinder and piston.

19. In a press for curing tires from bands in which the curing medium is in direct contact with the interior of the uncured tire, said press having relatively movable mold sections and each section having a bead seat therein, means for moving the mold sections together to shape a band therein, and roller means to shape and force the edges of the band into their respective bead seats.

20. In a press for curing tires from bands in which the curing medium is in direct contact with the interior of the uncured tire, said press having relatively movable mold sections and each section having a bead seat therein, means for moving the mold sections together to shape a band therein, and rollers movable into the interior of the shaped band and against the inner faces of the edges of the band to shape and force the edges of the band into their respective bead seats.

21. In a press for curing tires from bands in which the curing medium is in direct contact with the interior of the uncured tire, said press having relatively movable mold sections and each section having a bead seat therein, means for moving the mold sections together to shape a band therein, roller means to shape and force the edges of the band into their respective bead seats, and means to propel the roller means about the inner circumference of the tire band.

22. In a press for curing tires from bands in which the curing medium is in direct contact with the interior of the uncured tire, said press having relatively movable mold sections and each section having a bead seat therein, means for moving the mold sections together to shape a band therein, rollers movable into the interior of the shaped band and against the inner faces of the edges of the band to shape and force the edges of the band into their respective bead seats, and means to propel the rollers about the inner circumference of the tire band.

23. In a press for curing tires from bands in which the curing medium is in direct contact with the interior of the uncured tire, said press having relatively movable mold sections and each section having a bead seat therein, means for moving the mold sections together to shape a band therein, and rollers movable into the interior of the shaped band and yielding means to hold the rollers against the inner faces of the edges of the band to shape and force the edges of the band into their respective bead seats.

24. In a press for curing tires from bands in which the curing medium is in direct contact with the interior of the uncured tire, said press having relatively movable mold sections and each section having a bead seat therein, means for moving the mold sections together to shape a band therein, rollers movable into the interior of the shaped band and against the inner faces of the edges of the band to shape and force the edges of the band into their respective bead seats, and means to propel the rollers about the inner circumference of the tire band, and yielding means to hold the rollers against the inside surfaces of the band during the rolling operation.

25. A press for curing a tire in which the curing medium is in direct contact with the interior of the tire, comprising mating mold sections, a bead seat in a mold section, and means operative while the mold is closed about the uncured tire and while the curing medium is in direct contact with the interior of the tire for pressing a beaded edge of the uncured tire into its bead seat by a circumferential rolling action.

26. A press for curing a tire in which the curing medium is in direct contact with the interior of the tire, comprising mating mold sections, a bead seat in a mold section, and means operative while the mold is closed about the uncured tire for pressing a beaded edge of the uncured tire into its bead seat by a circumferential rolling action.

27. A press for curing a tire in which the curing medium is in direct contact with the interior of the tire, comprising mating mold sections, a bead seat in a mold section, and means operative while the mold is closed about the uncured tire and while the curing medium is in direct contact with the interior of the tire for pressing a beaded edge of the uncured tire into its bead seat by a rolling action.

References Cited in the file of this patent

UNITED STATES PATENTS

| | | |
|---|---|---|
| 2,715,245 | Soderquist | Aug. 16, 1955 |
| 2,728,105 | Pacciarini | Dec. 27, 1955 |
| 2,730,763 | Brundage | Jan. 17, 1956 |
| 2,736,059 | Frank | Feb. 28, 1956 |